United States Patent [19]
Lunn et al.

[11] Patent Number: 6,075,848
[45] Date of Patent: Jun. 13, 2000

[54] CALL PATTERNS IN A COMMUNICATIONS NETWORK

[75] Inventors: Timothy J Lunn, Colorado Springs, Colo.; Ian P Thomas, Ipawich, United Kingdom

[73] Assignee: British Telecommunications public limited company, London, United Kingdom

[21] Appl. No.: 09/043,295

[22] PCT Filed: Sep. 18, 1996

[86] PCT No.: PCT/GB96/02331

§ 371 Date: Mar. 18, 1998

§ 102(e) Date: Mar. 18, 1998

[87] PCT Pub. No.: WO97/11547

PCT Pub. Date: Mar. 27, 1997

[30] Foreign Application Priority Data

Sep. 18, 1995 [EP] European Pat. Off. .............. 95306560

[51] Int. Cl.[7] .................................................. H04M 15/00
[52] U.S. Cl. ........................... 379/113; 379/34; 379/133; 379/279
[58] Field of Search ............................ 379/111–115, 127, 379/133–135, 137–139, 265–266, 309, 279, 34, 120

[56] References Cited

U.S. PATENT DOCUMENTS

| | | | |
|---|---|---|---|
| 5,295,183 | 3/1994 | Langlois et al. | 379/113 |
| 5,592,530 | 1/1997 | Brockman et al. | 379/34 |
| 5,606,600 | 2/1997 | Elliott et al. | 379/112 |
| 5,606,601 | 2/1997 | Witzman et al. | 379/113 |
| 5,854,834 | 12/1998 | Gottlieb et al. | 379/113 |

FOREIGN PATENT DOCUMENTS

| | | |
|---|---|---|
| 2130050 | 5/1984 | United Kingdom . |
| 2204463 | 11/1988 | United Kingdom . |
| 2257869 | 1/1993 | United Kingdom . |

OTHER PUBLICATIONS

HET PTT–BEDRIJF, vol. 24, No. 1, Dec. 1886, Den Haag (NL), pp. 30–35, XP000563400 C. Noordegraaf: "Herhaalde Oproepen: Een Studie Naar Abonneegedrag" cited in the application 2; table 1.

Proc. Tenth International Teletraffic Congress– Session 2.4 Paper 2, vol. 1, Jun. 9–15, 1983, Montreal(CA), pp. 1–4, XP002021531 Lewis et al: "Measurements of Repeat Call Attempts in the Intercontinental Telephone Service" cited paragraph 3.

Bell System Technical Journal,vol. 59, No. 3, Mar. 1980, New York US, pp. 295–311, XP000560635 K.S.LIU: Direct Distance Dialing: Call Completion and Customer Retrial Behavior see page 297, left–hand column, line 17– line 38.

Tenth International Teletraffic Congress–Session 2.2 Paper 7, vol. 1, Jun. 9–15, 1983, Montreal (CA), pp. 1–6, XP002021532 Becker Simcha et al: "Killer Routes and Killer Numbers in Telephone Networks".

*Primary Examiner*—Curtis A. Kuntz
*Assistant Examiner*—Duc Nguyen
*Attorney, Agent, or Firm*—Nixon & Vanderhye P.C.

[57] ABSTRACT

In a communications network, call records are generated by a plurality of originators (CLI#1, CLI#2, CLI#3) making calls to a service provider (180). The call records are stored in a database (145) which forms part of the billing function (140) of the network. The call records for the service provider (180) are collated and sent to the service provider for processing. The service provider is provided with a system for analyzing the call records to establish the number of lost callers, rather than the number of lost calls. This is possible since the call records include the CLI information of the originators. This information, gathered over a predetermined period of time, allows the service provider (180) to estimate the number of answering stations (170) necessary to optimize call answering and minimize the number of lost callers.

3 Claims, 7 Drawing Sheets

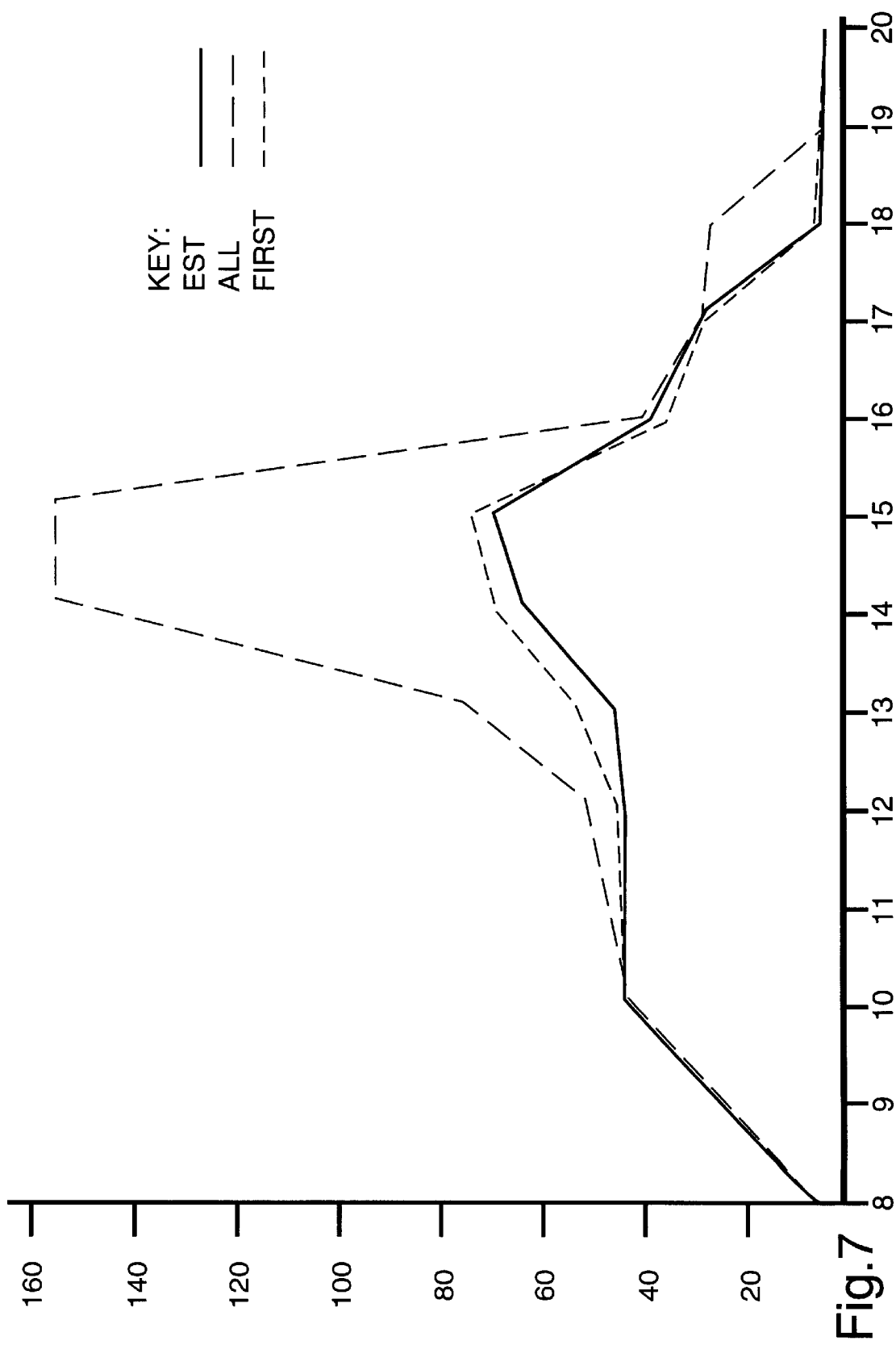

CALL PATTERNS IN A COMMUNICATIONS NETWORK

The present invention relates to call patterns in communications networks and particularly, but not exclusively, to methods and apparatus for determining call patterns in a communications network for particular call destinations.

Service providers who provide or sell a service by telephone over a communications network, for example insurance service providers, telephone information hotlines or premium rate call services, typically operate answering centres having a number of answering stations for answering calls directed to the service provider. Answering stations may comprise, for example, telephones having human operators for answering calls, or computer-based systems answering calls directly. Computer-based systems most commonly simply play pre-recorded information, however, in some cases, they do provide the facility to interact with a caller via, for example, codes which may be input by a caller using a telephone keypad or via speech recognition.

For service providers whose business relies heavily on telephone custom, it is important to optimise the number of answering stations in operation: too many answering stations are a waste of resources and too few answering stations can result in loss of calls and hence loss of business revenue.

To some extent, the number of answering stations required for an incoming call centre can be forecast by service providers using historic call record data made available by communications network operators. The type of historic call record data available varies, but typically might comprise an indication of the number of successful (effective) calls and the number of failed (ineffective) calls. From this type of call information, it is possible for a service provider to estimate future answering station requirements on the basis of how many calls are being lost.

Call record analysis is known, per se, for measuring call traffic handling performance in telecommunications networks. In "Redialling: a study of subscriber behaviour", C Noordegraph, Het PTT-Bedrijf, vol. 24, no. 1, December 1986 The Hague, historic call data, originating from 96 people from each of 24 designated exchange areas, was collected over a period of four weeks. An analysis of the call record data on the basis of called "destination" in terms of the terminating one hundred group, (because of suppression of the last two of the dialled digits in the process of making the call record information available for the analysis), was used to determine caller behaviour, and in particular the probability that a caller is likely to re-dial in the event of the first call being ineffective. The results lead to the conclusion that increased capacity for call traffic in the network would lead to increased revenue, given that some re-dials were due to congestion in the network and that not all callers were persistent enough to re-dial. The analysis is concerned solely with re-dialling behaviour and such matters as reply probabilities, and is not concerned with issues of traffic volumes.

In "Measurements of repeat call attempts in the international telephone service", by A. Lewis and G. Leonard, Proceedings of the tenth international teletraffic congress—session 2.4 paper 2, vol. 1, Jun. 9–15, 1983 Montreal, historic call record data was analysed for international calls routed through an international gateway. The data was, again, used to determine caller behaviour in the event a first call was unsuccessful.

In accordance with a first aspect, the present invention provides a method of indicating, for a call centre identified by a particular network number and connected to a communications network having a billing function including the generation and storage of call records, the shortfall in the number of answering stations at the call centre required to be active to meet a specified probability that a sequence, as herein defined, will be lost, the method comprising the steps of:

accessing the billing function in accordance with said particular network number and making a copy of respective call records relating to call attempts delivered to said particular network number, each said copy comprising calling number, outcome, and timing information from which the start time and the duration of the call can be ascertained;

sorting said copies into sets such that each set relates to a respective calling number and, where a set contains a plurality of said copies, these copies are ordered chronologically;

for each of said sets which contains a plurality of said copies, dividing the respective ordered copies into sequences of one or more copies such that (i) if the time interval between an adjacent pair of call attempts of the set is greater than a predetermined value, then the call attempt having the earlier start time is the last of its sequence and the call attempt having the later start time is the first of its sequence, and (ii) each successful call attempt is the last of its sequence, designating a sequence as either (a) an answered sequence if it contains a successful call attempt, whether or not that successful call attempt is preceded by one or more unsuccessful call attempts, or (b) a lost sequence if it does not contain a successful call attempt;

counting the answered sequences and the lost sequences;

using the values of call duration and the counts of answered and lost sequences to obtain a value for the offered traffic in Erlangs, an actual value for the ratio of lost sequences to total sequences, and, via the appropriate Erlang formula, an estimate of the effective number of active answering stations;

using said value for the offered traffic, and said specified probability to obtain, via said Erlang formula, an estimate of the number of answering stations which would have been needed to be active to achieve said specified probability that a sequence will be lost; and, in the event that this latter estimate is greater than the former estimate, providing an indication of the shortfall.

The invention is particularly appropriate for near real time monitoring of the level of service provided by the call centre to generate the indication of the shortfall in the event of, say, an unexpected increase in incoming calls to a call centre of a share dealing company.

Therefore, preferably, there is included the step of transferring the copies from the billing function of the network to an operator of the call centre, and said steps of sorting, dividing, designating, counting, processing, and providing are performed by that operator.

More preferably, the accessing step is such that said transferring step is performed substantially immediately after the billing function has generated the call records.

The method of the present invention could be performed using call records from any network providing the appropriate call record data.

The present invention uses call record analysis for a significantly different purpose than those of the prior art documents described above. The prior art documents describe methods of analysing network traffic, originating from many sources and directed to many sources, to aid network design. The present invention is directed to optimising call centre answering station numbers. The term "call centre" in the context of the present invention encompasses public service providers, such as Internet Service Providers, and private operators of call centres, such as telephone betting agencies.

The present invention is also significantly different in terms of the call record information required. In particular, the present invention processes only call records directed to a single destination. Also, the present invention relies heavily on the call records containing accurate call origin information. In contrast, neither prior art document is concerned with the volume of traffic offered to a particular destination, and neither describes a system which processes call duration information in combination with a re-dialling analysis, and applies an Erlang formula to provide the shortfall indication as does the present invention.

The present invention will now be described in more detail, by way of example only, with reference to the drawings, of which:

FIG. 7 is a graph showing Erlang calculations based on the data in the graphs of FIGS. 5 and 6.

Figure 1:
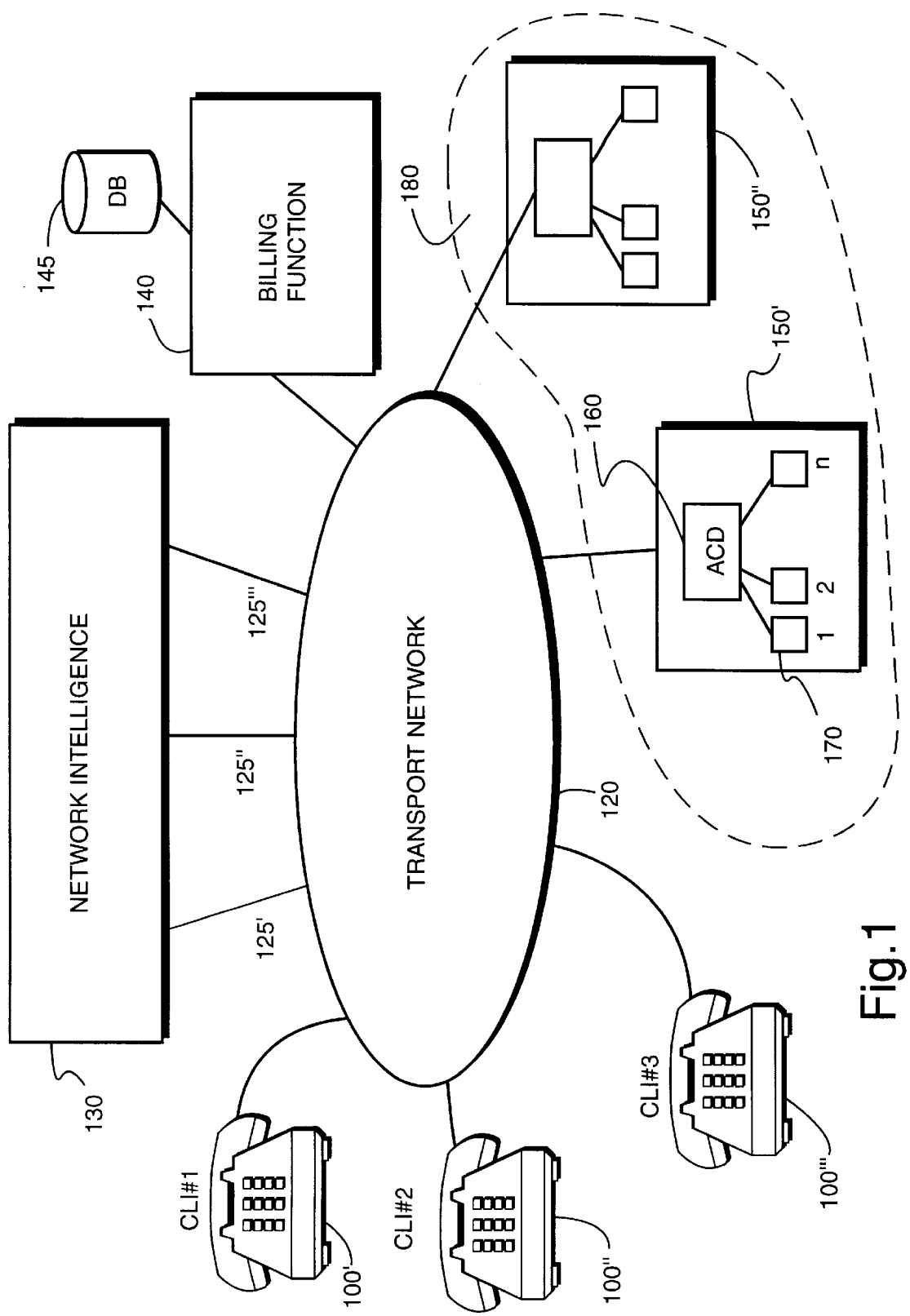
FIG. 1 is a diagram which represents an example of a network configuration.

FIG. 1 is a diagram representing a communications network. In the network, there are a number of telephones 100 shown connected to a transport network 120. The transport network 120 is of known type, for example a public switched telephone network, and comprises local exchanges and trunk exchanges (not shown). Typically, although it is not shown in the diagram, the telephones 100 are connected to local exchanges in the transport network 120, each local exchange is connected to at least one trunk exchange, also known as a digital main switching unit (DMSU), and the DMSUs are typically fully interconnected with each other. Also, at various points in the transport network, there are connections 125 to network intelligence equipment 130.

The communications network includes a billing function 140, responsible for receiving call record information from the transport network 120 and for calculating respective bills. The billing function 140 includes a database 145 for storing the call record information.

In practice, the communications network includes other functions, for example network management and service management functions, which for clarity have not been shown on in FIG. 1, but are assumed to be present.

Answering centres 150 are also connected to the transport network 120. The answering centres 150 may be connected to either trunk or local exchanges, depending on the call capacity requirements of the answering centres 150 and of the transport network 120. Each answering centre 150 comprises an automatic call distributor (ACD) 160 and a number n of answering stations 170, each connected to the ACD 160. The ACDs 160 allocate incoming calls to answering stations 170. In this case, the answering stations 170 comprise telephones manned by human telephone operators (not shown). Some ACDs can also allocate calls to a queuing system (not shown) which can hold several calls in a queue until an answering station becomes available. The answering centres 150 together make up a distributed answering centre 180 which in this example represents a called party.

A distributed answering centre 180 comprises more than one answering centre 150, whereby calls to a single number can be distributed in dependence upon number translation facilities provided by the network intelligence equipment in the communications network to re-direct calls between call centres. For example, for BT's Directory Enquiries service, answering centres are distributed in several locations, and a telephone call to a single Directory Enquiries number, 192, might be answered in any of the answering centres, depending on a number translation system in the network intelligence which is able to take into consideration call loads in each answering centre.

In operation, a telephone call to a service provider is made by a caller from a telephone 100'. The telephone call generates a call request when a caller dials the generic number of the service provider. The call request is processed by the network intelligence equipment 130 as follows. The network intelligence equipment 130 relates the generic telephone number of the service provider to there being two possible answering centres 150' and 150" each having a different, specific telephone number to which the call can be directed. The network intelligence equipment 130 also has access to information about calls which are currently in progress at each answering centre 150 and the number of answering stations 170, or the capacity of a queuing system, in each answering centre. From this information, the network intelligence equipment 130 determines to where the call should be directed to be answered, for example to answering centre 150", and translates the generic number of the service provider to the specific number of the selected answering centre 150". The number is passed to the transport network which routes the call to answering centre 150" accordingly.

When all answering stations 170 in the answering centres are busy, and any queuing systems are full, the caller will obtain an engaged tone. The caller will then hang up and decide to try again immediately with the hope of being successful, try again later or give up.

Figure 2:
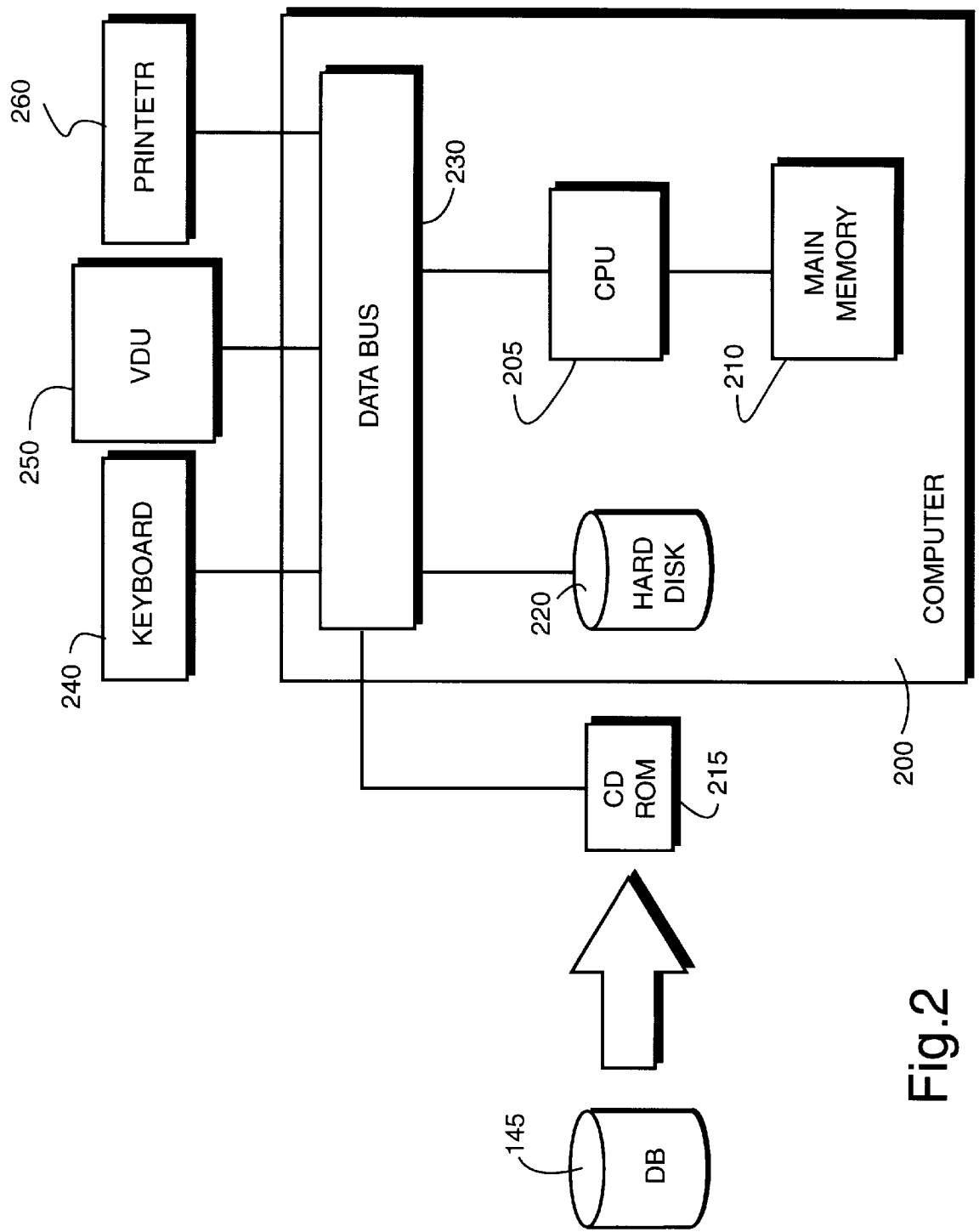
FIG. 2 is a diagram which represents a system suitable for carrying out the invention.

All call attempts, whether effective or not, generate call records which are stored by the billing function 140 on the database 145. According to the present example, call records include:

date & time of the call duration of the call;

time to answer the call;

network calling line identity (CLI) of the caller a flag indicating whether a call was effective or not; and the identity of the call centre handling the call;

FIG. 2 shows the arrangement of equipment required by a service provider to work the invention. The equipment comprises a general purpose computer 200, such as an IBM compatible 80386 personal computer, and standard peripheral devices such as a CD-ROM drive 215, a keyboard 240, a visual display unit 250 and a printer 260.

The computer 200 comprises a central processing unit 205 which is connected to main memory 210 and a data bus 230. The data bus 230 provides data transmission paths between the central processing unit 205 and a secondary storage device such as a hard disk drive 220 and interfaces (not shown) to the peripheral devices 215, 230, 240, 250 and 260.

The invention is controlled by software, for example written in the C programming language, held in the main memory 210 and which is processed by the central processing unit 205.

Initially, the call records are stored on the database 145 which forms part of the billing function 140 of the communications network. The call records are stored, as they are made available by the transport network 120, in chronological order, with the CLI of the originator being stored as one field of each call record.

A copy of the call records directed to a particular service provider, held on the database 145, is supplied to the service provider when the service provider requires its call record information. The call record information is typically transferred to the service provider on a CD-ROM. The CD-ROM is inserted into the CD-ROM drive 215 where the information can be accessed by the central processing unit 205.

It should be noted that, in some cases, the processing might be carried out by a party other than the service provider, for example by a data mining company which sells respective information to service providers, or even by the communications networks operator itself which might sell the information to service providers or offer the information as a free service.

The central processing unit 205 runs the software embodying the invention and provides results, as described below. The results can be viewed as numerical data or graphical representations of the data on the visual display unit 250. In the latter case, further commercially available software can be provided to generate suitable graphical data from the computed numerical data. Finally, the results, in whatever form, can be stored on the hard disk drive 220 and printed on the printing device 260 if required.

For the purposes of the present description, a "sequence" of calls is defined as being sequential calls from the same caller (ie from one CLI). One CLI can generate a number of sequences.

Figure 3:
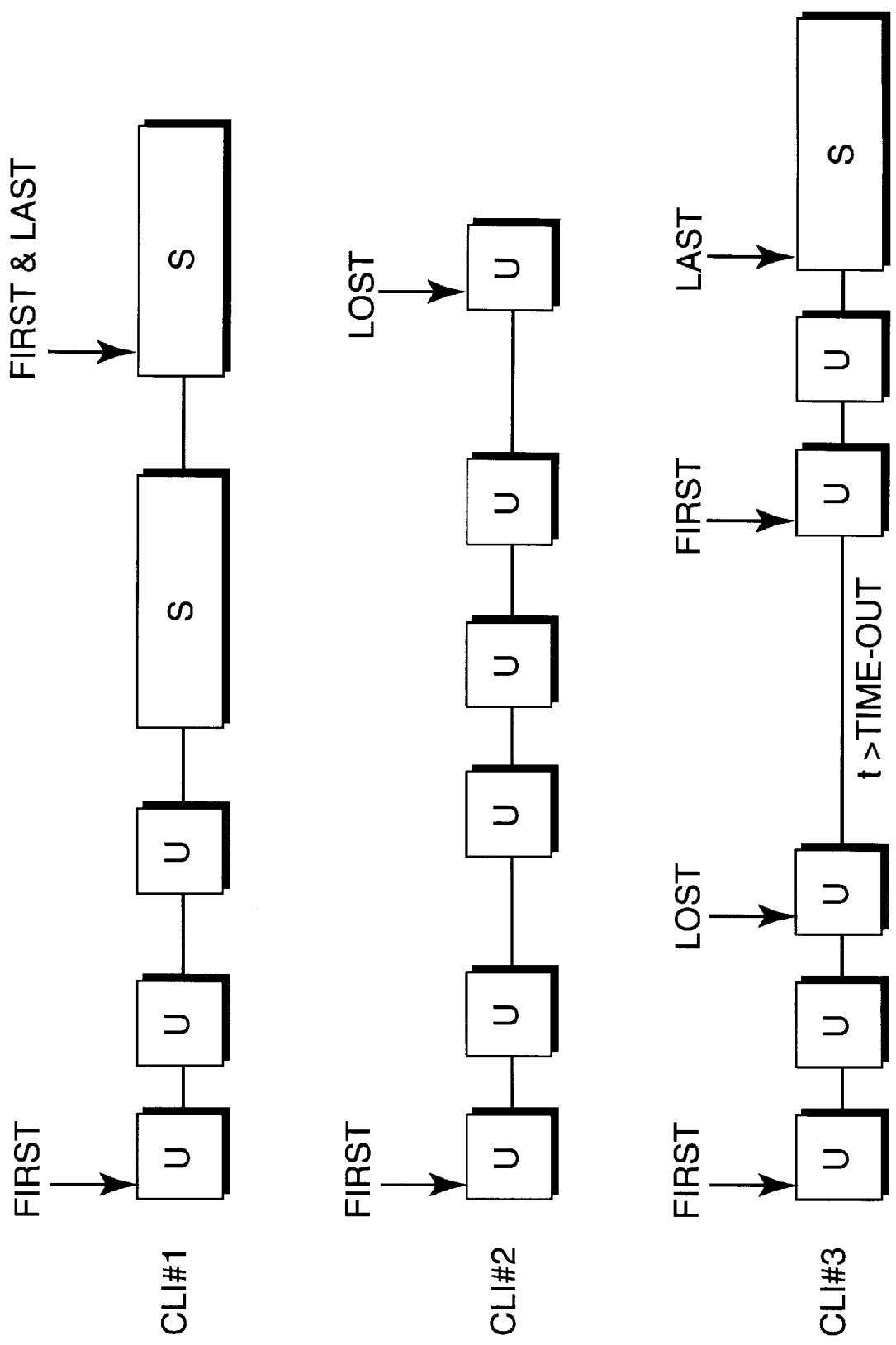
FIG. 3 is a diagram which shows example call sequences.

FIG. 3 illustrates example call sequences originating from three different CLIs—CLI#1, CLI#2 and CLI#3. If a sequence contains an effective, or successful call S, the call is defined as the last call in a sequence, unless it is the only call, in which case it can be either the last call or the first call as illustrated for CLI #1. If a call is ineffective, or is not successful, then it is represented as an unsuccessful call U. If there are further calls from the same CLI, after a successful call S, as illustrated for CLI #1, these calls are defined as members of further sequences.

As illustrated for CLI #2, the last call in a sequence, if unsuccessful, is classed as a lost call, which ends a sequence.

As illustrated for CLI #3, a sequence can also be terminated by an unsuccessful call U followed by a user-defined time period, or time-out period. The duration of the time-out period is adjusted to suit the type of service, and hence the expected type of call pattern, for a particular service provider. The first call after the time-out period is classed as a first call in a new sequence.

In FIG. 3, "First" calls are defined as the first calls in a sequence, no matter whether they are successful or unsuccessful. "Lost" calls are defined as unsuccessful calls which are the last in a sequence. Also, when queuing systems are in use, a queued call which is eventually answered is classed as successful and a queued call which remains unanswered, due to the caller hanging-up the call, before an answer station becomes available is classed as unsuccessful.

Call sequences may also be defined by other criteria. For example, if the call duration is only expected to be short, for example twenty seconds, a call sequence may be defined as including a maximum of three calls from one CLI in a period of two minutes. Then, if there are seven unsuccessful calls from one CLI in a two minute period, they would count as three call sequences having three lost calls. Other call sequence definitions will become apparent to the skilled person in dependence on the type of service provider service and the duration over which call records are processed. For example, a call sequence definition for a television-triggered telephone competition, where a caller may make many call attempts to the same number in a very short period of time, would necessarily be very different from a telephone-based insurance sales company, where a caller may only make one or two attempts before waiting later to try again, or indeed before moving onto the next insurance company.

In general, the first, or earliest, call of a CLI will act as a basis for defining first calls, with other first call definitions, or sequence definitions being included as significant depending on the requirements of the service provider.

It will be appreciated that CLI information stored by communications network operators might be confidential, particularly if some CLIs belong to ex-directory, or unlisted, origins. Obviously then, it would not be acceptable to disclose the CLI information to anyone else. To overcome this problem, for the purposes of the present invention, the inventors 'scramble' the CLI data using one-way encryption functions (or functions having no inverse) to hide the identities of the originators of the calls. Thus, the CLI information is replaced by tokens, or references, which bear no apparent relation to the original CLIs, whilst the rest of the call record information remains unaltered. Such encryption techniques are generally known and are beyond the scope of the present description.

Table 1 shows call attempts originating from four different CLIs (3228, 4667, 5149 and 6449) over a period of time between 8 am and 5 pm. Obviously, in a real-life situation, calls would be made from many more originating CLIs but, for the sake of simplicity in this example, only four CLIs are shown. Unsuccessful call attempts are a result of there being no free answering stations in operation at the time of the call, typically because all stations are busy with other calls (which originate from other CLIs which are not shown).

Although call records for only one day are included in Table 1, it is important to remember that call records can be made available for any period of time from when suitable call records are available from a communications network to the present. The periods over which the records are analysed is simply then the choice of the service provider, or other party analysing the call records, depending only on when call records become available or for how long the call records are kept.

Figure 4:
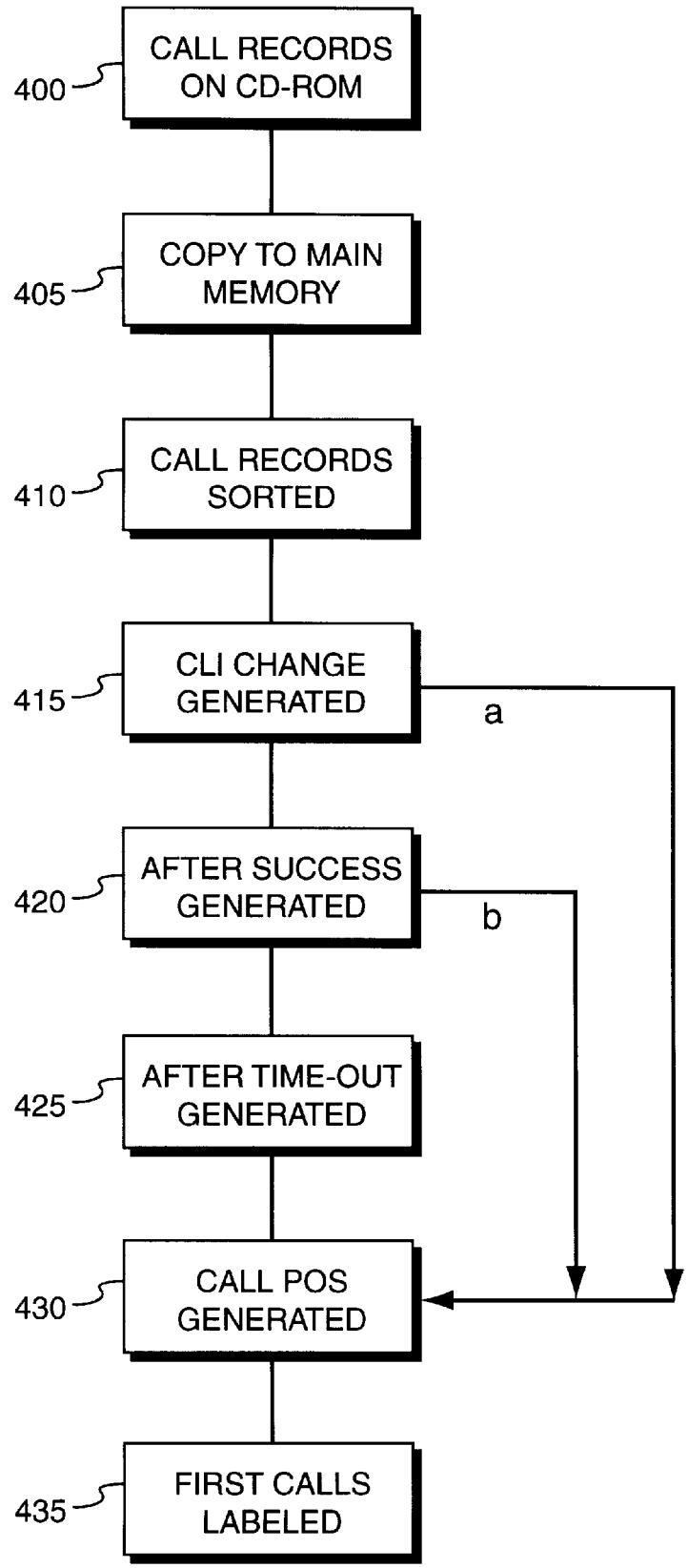
FIG. 4 is a flow diagram showing the steps involved in carrying out the invention.

FIG. 4 shows the steps of the invention. Initially, FIG. 4 shows, in step 400, data on the CD-ROM stored substantially in accordance with Table 1. The data fields in Table 1 include the CLI of the originator, the time of the call and a flag which indicates whether or not the call was successful, where a "1" indicates that the call was successful and a "0" indicates that the call was unsuccessful, or a failure.

In step 405, the data is accessed by the central processing unit 205 and copied to main memory 210 where it can be manipulated by the central processing unit under the control of the software. In step 410, the call records are sorted, first by CLI reference, and then by time for each CLI reference. This has the effect that calls from the same CLI are grouped together and within the groups the calls are in chronological order.

A illustrated in Table 2, in step 415, a column labelled "CLI Change" is generated which indicates for each call record whether it is the first record for a new CLI. Then, in step 420, a column labelled "After Success" is generated which indicates for each call record whether the record follows on from a successful call by the same caller.

A column labelled "After Time-out" is then generated in step 425 which indicates for each record whether the record follows on from a record from the same caller after a duration greater than the time-out period, which in this case is thirty minutes. After the "After Time-out" column, in step 430, a column labelled "Call Pos" is generated which holds an attribute which is calculated as the position of a call within a call sequence.

The "Call Pos" column values are generated by stepping through the call records from the top, that is to say the end with the lowest CLI and the earliest times for each CLI, and numbering the call records sequentially as the list is stepped through, starting from 1.

As illustrated in Table 2, the count in the "Call Pos" column is reset to 1 for:
 a call with a new CLI;
 a call after a successful call; and
 a call where the time gap between the call and the previous call in the list exceeds the pre-determined time-out period.

Finally, in a step 435, a column labelled "First Call" is generated which holds a "1" for all first calls in a sequence, where first calls are those having a "1" in the "Call Pos" column. It can be seen from Table 2 that there are eight first calls.

As a general rule, the first call in a list of calls is classed as a first call.

The alternate paths a and b, from steps 415 and 420 respectively, illustrate that the call positions generated in step 435 may only rely on one or two first call sequence definitions rather than all three. The choice of the number and type of first call sequence definitions is determined by the service provider in dependence on the type of business and corresponding call patterns being generated, as described above.

A similar procedure is carried out as that shown in FIG. 4 to identify the last calls in the call sequences, and hence the lost calls. The respective data generated to indicate lost calls is shown in Table 3. Calls from the same CLI are grouped together and within these groups calls are grouped in reverse chronological order.

The initial call record data in Table 3 is the same as that in Tables 1 and 2. The extra information is added in substantially the same way as for Table 2 except that lost calls are highlighted rather than first calls.

The sorted list in Table 3 is stepped through from the end with the lowest CLI and the latest times for each CLI. The calls are numbered sequentially in the "Call Pos" column as the list is stepped through, starting from 1. The count is reset to 1 for:
 a call with a new CLI;
 a successful call (note that this is different from the secondary set condition in the identification of first calls above in Table 2); and
 a call where the time gap between the call and the previous call in the list originating from the same CLI exceeds a pre-determined time-out period (again, this period is set at 30 mins).

The lost calls are the unsuccessful calls that are labelled with a 1 in the "Call Pos" column. It can be seen that there are three lost calls.

The lost calls in Table 3 represent potentially lost customers, or lost business, rather than the number of overall lost calls.

It will be appreciated that the above steps are described by way of example only to explain the procedure. It will, thus, also be appreciated that the actual steps carried out in software might not follow the same specific procedure to arrive at the same results. For example, several steps might be carried out simultaneously. Therefore, it is intended that any procedure which arrives at substantially the same result comes within the bounds of the present invention.

In practice, at some stage, the actual period over which a service provider wishes to analyse the call record data will be defined. The period would depend on how much data is available, how often it is provided and the period of interest to the service provider. It is expected that call record information will be provided by a communications network operator on a monthly basis, although any other period could be defined. In this example, the period is defined simply by the call records shown. In practice it would typically be the periods of peak call rate which would be of interest to the service provider, since it is at peak times where a significant amount of custom is more likely to be lost if too few answering stations are in operation. However, clearly a correct assessment of the number of required operators at times other than the peak is also of interest to the service provider.

Table 4 shows call record statistics generated for a telephone betting agency which took telephone bets for the English Grand National horse race. The number of telephone answering stations was 75. In the table: "#suc" is the number of successful calls; "#unsuc" is the number of unsuccessful calls; "#tot" is the total number of calls (#suc+#unsuc); "#first" is the number of first calls derived as described above; "dur" is the average call duration in seconds; "est" is an estimate of the number of answer stations in operation calculated using the Erlang B traffic formula; "all" is the number of required answering stations calculated using the Erlang B formula and all (#tot) call requests; and "first" is the number of required answering stations calculated using the Erlang traffic formula and only first (#first) call requests.

Figure 5:
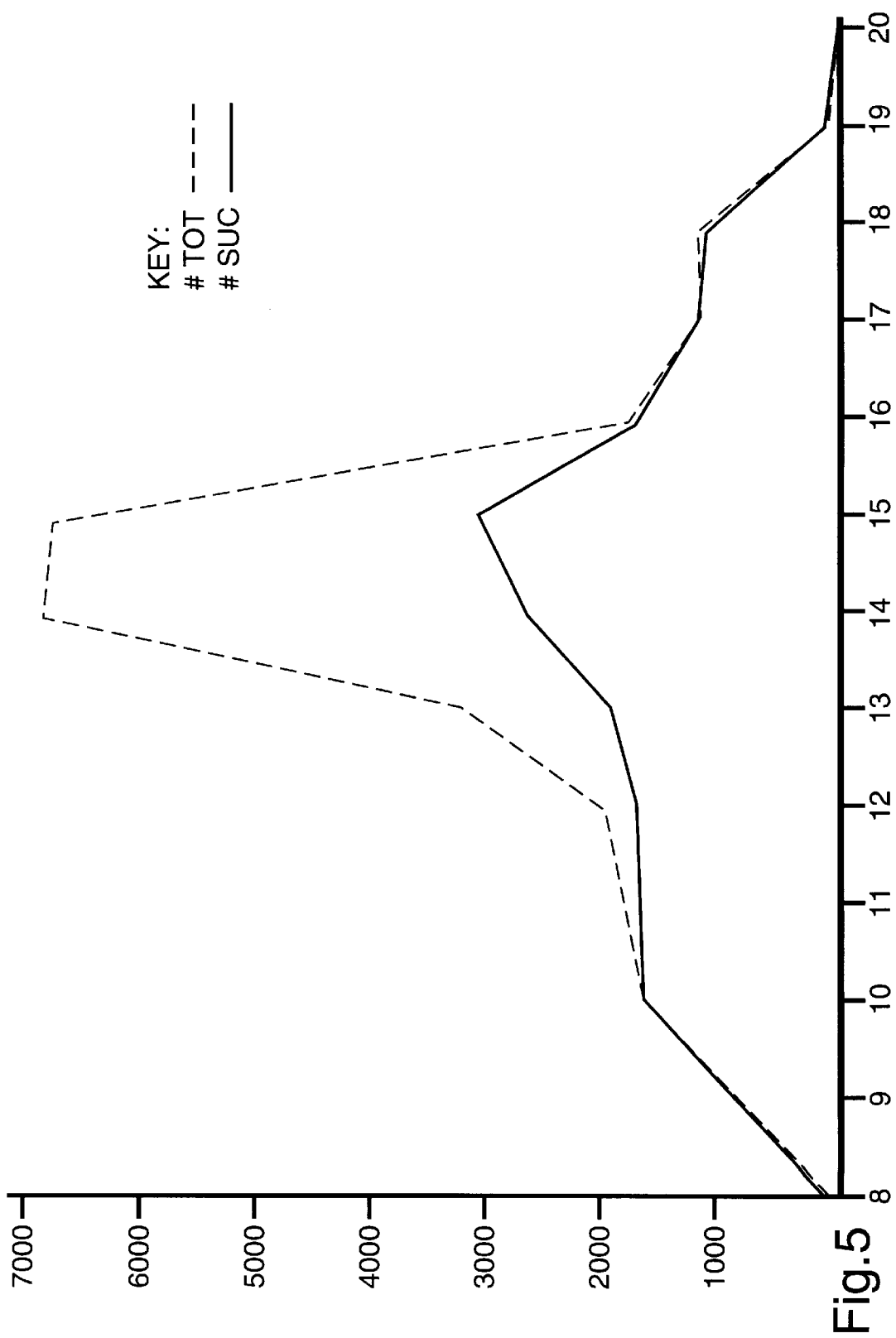
FIG. 5 is a graph showing the total number of calls and the number of successful calls received by an answering centre over a period of one day.

The graph in FIG. 5 is generated from the data in Table 4. The graph shows the rate at which calls were being made to the call centre (#tot) and the rate at which calls were handled by the call centre (#suc). These statistics, available from the raw call record data directly, show that nearly 7000 calls were attempted in one hour running up to the start of the race at 3.00 pm, but the call centre could only handle a maximum of around 3000 calls in any one hour. Call records generated after the Grand National (after 3.00 pm) relate to bets placed on subsequent races during the day.

Figure 6:
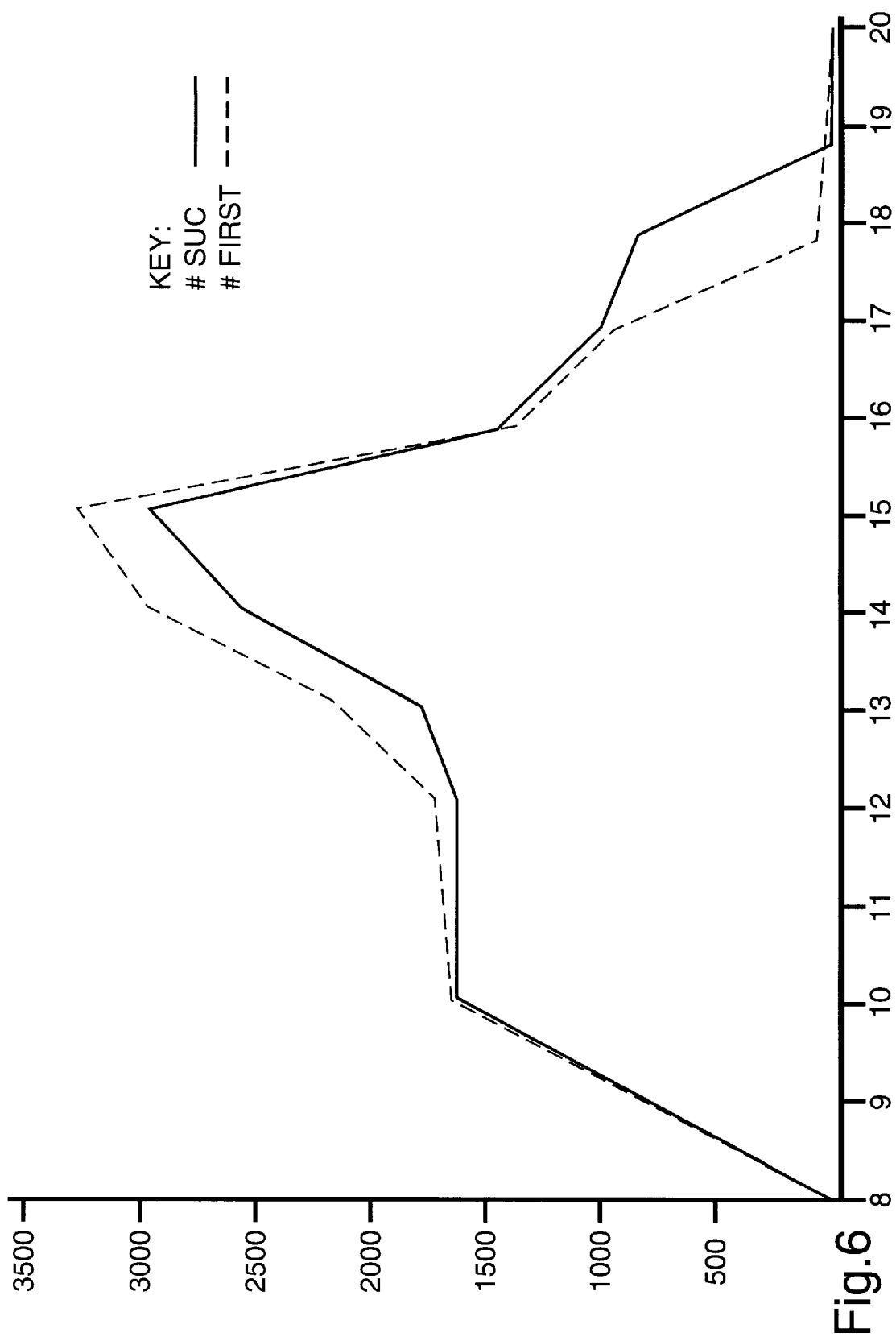
FIG. 6 is a graph showing the number of first calls out of the total number of calls shown in the graph of FIG. 5 and the number of successful calls.

The graph in FIG. 6 shows a comparison of the rate at which calls were handled (#suc) with the rate at which first call attempts were made (#first), calculated using the "first call" analysis described above. It is clear from this graph that the actual difference between stimulated and handled traffic is much less than is suggested by the graph in FIG. 5.

The graph in FIG. 7 shows the results of the Erlang traffic calculations based on the call pattern numbers of the graphs in FIGS. 5 and 6. The "est" line shows the calculated number of call stations required to handle #suc calls (where the number of call stations was in fact 75). The "all" line shows that if the total number of calls (#tot) was used to calculate the number of call stations required, the number would be roughly double the number actually being used. Finally, using the calculated number of first calls (#first) the "first" line shows that an increase in the number of lines and answering stations of around only 10% would be sufficient to make sure that no calls were blocked.

Traffic analysis using the Erlang formulae to calculate the number of trunks (or call stations) necessary to maintain a specified level of service has been widely reported and used to maintain communication network service levels for a number of years. One form of the Erlang B formula is shown below:

$$P = \frac{\frac{A^N}{N!}}{\sum_{x=0}^{N} \frac{A^x}{x!}}$$

where
   A=offered traffic (Erlangs)
   N=number of answer stations
   P=probability that a call will be lost
and where offered traffic A is calculated as:

$$A = \lambda h$$

where
   $\lambda$=the mean rate of call attempts per unit of time
   h=the mean holding time per successful call A detailed discussion of the formulae is beyond the scope of the present description, but the reader is referred, for example, to the text books referenced below for further information, if required. In particular, reference [3] includes computer programs for carrying out the appropriate calculations.

In general, where incoming calls are lost (ineffective) if no answering station is available, the Erlang B formula is appropriate for the calculations. Where incoming calls are queued (in a finite length queue) until a call station becomes available, the Erlang C formula is appropriate for the calculations.

The equations require values of the average calling rate and the average call duration. Average call duration can be calculated from the call duration values available for each call. Such values may be available from the call records directly or from customer billing records.

Thus, from the graph in FIG. 7, it can be seen that the betting agency (the service provider) would only need to increase answering station capacity by about 10% to optimise revenue from betting, by serving substantially all callers using the fewest possible answering stations. Using raw statistics, which simply show the number of lost calls, the betting agency might erroneously feel it necessary to increase answering station capacity by up to 100% to handle every call made at peak betting times.

It is clear from these calculations that the present invention provides an invaluable tool for any undertaking interested in conducting business by telephone. Uses of the invention other than that described above will become apparent to the skilled person. For example, the present invention may be used to calculate the number of answering stations required for a dial-up "logon" point for services such as Compuserve (TM) or the Internet. In these cases, failure to access the network due to there being too few lines, or access points, would result, in the short term at least, in reduced customer satisfaction rather than direct loss of revenue.

Embodiments of the present invention could be arranged to provide a near real time assessment of the number of required answering stations for some service providers. For example, call records could be processed, as described above, to indicate a shortfall in answering stations over, say, the past five or ten minute period. This assumes that call records for calls to a service provider were, for example, transferred to a database accessible by the service provider as soon as possible after the call records were generated. If processing then highlights a need for more operators, surplus operators (for example, those taking a lunch break or an afternoon tea break) could be re-called to man their previously inactive answering stations to meet an increased demand.

Such embodiments might be useful, for example, in a share dealing scenario where shorter term historical data, for example collected over the preceding five or ten minutes as suggested, could be used to cope more effectively with call surges resulting from, for example, unexpected share market movements. Also longer-term historical data, for example collected over days or weeks, would be used to plan for normal answer station requirement variations, for example, to cope with normal peaks at the beginning and at the end of the share dealing day.

Presently, such rapid call record access is not feasible. However, this does not preclude more rapid access becoming a reality in future and, as such, the present invention is intended to encompass all such eventualities.

References

[1] "Telecommunications Networks", IEE Telecommunications Series 1, edited by J E Flood, first published 1975.

[2] "Communication Switching Systems", Rubin & Haller, Reinhold Publishing Corporation NY, Chapman & Hall Ltd, London, 1966.

[3] "Local Networks", William Stallings, Third Edition, Published by Collier Macmillan Canada, Inc. 1990.

[4] "Telecommunications Engineering", J. Dunlop & D. G. Smith, Second Edition, Published by Van Nostrand Reinhold, 1989.

Tables

TABLE 1

| CLI | Time | Success 1 Failure 0 |
|---|---|---|
| 4667 | 08:59:01 | 1 |
| 5149 | 10:12:14 | 0 |
| 5149 | 10:13:01 | 1 |
| 4667 | 11:31:27 | 0 |
| 4667 | 11:32:10 | 0 |
| 4667 | 11:32:56 | 0 |
| 4667 | 11:33:21 | 1 |
| 6449 | 12:27:58 | 0 |
| 6449 | 13:33:46 | 0 |
| 6449 | 13:35:02 | 1 |
| 5149 | 14:01:21 | 0 |
| 5149 | 14:03:17 | 1 |
| 5149 | 15:27:40 | 0 |
| 3228 | 16:08:13 | 0 |

TABLE 2

| CLI | Time | Success 1 Failure 0 | CLI Change | After Success | After Time-out | Call Pos | First Calls |
|---|---|---|---|---|---|---|---|
| 3228 | 16:08:13 | 0 | 1 | | | 1 | 1 |
| 4667 | 08:59:01 | 1 | 1 | | | 1 | 1 |
| 4667 | 11:31:27 | 0 | | 1 | 1 | 1 | 1 |
| 4667 | 11:32:10 | 0 | | | | 2 | |
| 4667 | 11:32:56 | 0 | | | | 3 | |
| 4667 | 11:33:21 | 1 | | | | 4 | |
| 5149 | 10:12:14 | 0 | 1 | 1 | | 1 | 1 |
| 5149 | 10:13:01 | 1 | | | | 2 | |
| 5149 | 14:01:21 | 0 | | 1 | 1 | 1 | 1 |
| 5149 | 14:03:17 | 1 | | | | 2 | |
| 5149 | 15:27:40 | 0 | | 1 | 1 | 1 | 1 |

TABLE 2-continued

| CLI | Time | Success 1 Failure 0 | CLI Change | After Success | After Time-out | Call Pos | First Calls |
|---|---|---|---|---|---|---|---|
| 6449 | 12:27:58 | 0 | 1 | | | 1 | 1 |
| 6449 | 13:33:46 | 0 | | | 1 | 1 | 1 |
| 6449 | 13:35:02 | 1 | | | | 2 | |

TABLE 3

| CLI | Time | Success 1 Failure 0 | First Call Count | CLI Change | Success | Time Gap Exceed | Call Pos | Lost Call |
|---|---|---|---|---|---|---|---|---|
| 3228 | 16:08:13 | 0 | 1 | 1 | | | 1 | 1 |
| 4667 | 11:33:21 | 1 | 4 | 1 | 1 | | 1 | |
| 4667 | 11:32:56 | 0 | 3 | | | | 2 | |
| 4667 | 11:32:10 | 0 | 2 | | | | 3 | |
| 4667 | 11:31:27 | 0 | 1 | | | | 4 | |
| 4667 | 08:59:01 | 1 | 1 | | 1 | 1 | 1 | |
| 5149 | 15:27:40 | 0 | 1 | 1 | | | 1 | 1 |
| 5149 | 14:03:17 | 1 | 2 | | 1 | 1 | 1 | |
| 5149 | 14:01:21 | 0 | 1 | | | | 2 | |
| 5149 | 10:13:01 | 1 | 2 | | 1 | 1 | 1 | |
| 5149 | 10:12:14 | 0 | 1 | | | | 2 | |
| 6449 | 13:35:02 | 1 | 2 | 1 | 1 | | 1 | |
| 6449 | 13:33:46 | 0 | 1 | | | | 2 | |
| 6449 | 12:27:58 | 0 | 1 | | | 1 | 1 | 1 |

TABLE 4

| Time | #suc | #unsuc | #tot | #first | dur | est | all | first |
|---|---|---|---|---|---|---|---|---|
| 8 | 60 | 10 | 70 | 65 | 75 | 5 | 6 | 5 |
| 9 | 807 | 3 | 810 | 785 | 74 | 25 | 25 | 25 |
| 10 | 1661 | 19 | 1680 | 1639 | 82 | 45 | 45 | 44 |
| 11 | 1660 | 135 | 1795 | 1687 | 90 | 45 | 48 | 45 |
| 12 | 1656 | 354 | 2010 | 1723 | 94 | 45 | 52 | 46 |
| 13 | 1814 | 1320 | 3134 | 2105 | 86 | 48 | 77 | 55 |
| 14 | 2572 | 4232 | 6804 | 2920 | 68 | 65 | 154 | 72 |
| 15 | 2949 | 3714 | 6663 | 3191 | 63 | 73 | 154 | 78 |
| 16 | 1462 | 82 | 1544 | 1369 | 70 | 40 | 42 | 38 |
| 17 | 1023 | 9 | 1032 | 962 | 90 | 30 | 30 | 29 |
| 18 | 889 | 42 | 931 | 103 | 69 | 6 | 28 | 7 |
| 19 | 56 | 16 | 72 | 63 | 75 | 5 | 6 | 5 |
| 20 | 48 | 7 | 55 | 47 | 53 | 5 | 5 | 5 |
| 21 | 42 | 4 | 46 | 39 | 60 | 4 | 5 | 4 |
| 22 | 29 | 0 | 29 | 29 | 60 | 4 | 4 | 4 |
| 23 | 4 | 0 | 4 | 2 | 60 | 2 | 2 | 2 |

We claim:

1. A method of indicating, for a call center identified by a particular network number and connected to a communications network having a billing function including the generation and storage of call records, the shortfall in the number of answering stations at the call center required to be active to meet a specified probability that a sequence, as herein defined, will be lost, the method comprising the steps of:

accessing the billing function in accordance with said particular network number and making copies of respective call records relating to call attempts delivered to said particular network number, each said copies comprising calling number, outcome, and timing information from which the start time and the duration of the call can be ascertained;

sorting said copies into sets such that each set relates to a respective calling number and, where a set contains a plurality of copies, these copies are ordered chronologically;

for each of said sets which contains a plurality of said copies, dividing the respective ordered copies into sequences of one or more copies such that
(i) if the time interval between an adjacent pair of call attempts of the set is greater than a predetermined value, then the call attempt having the earlier start time is the last of its sequence and the call attempt having the later start time is the first of its sequence, and
(ii) each successful call attempt is the last of its sequence, designating a sequence as either (a) an answered sequence if it contains a successful call attempt, whether or not that successful call attempt is preceded by one or more unsuccessful call attempts, or (b) a lost sequence if it does not contain a successful call attempt;

counting the answered sequences and the lost sequences;

processing the values of call duration and the counts of answered and lost sequences to obtain
a value for the offered traffic in Erlangs,
an actual value for the ratio of lost sequences to total sequences, and, via the appropriate Erlang formula, an estimate of the effective number of active answering stations;

processing said value for the offered traffic, and said specified probability to obtain, via said Erlang formula, an estimate of the number of answering stations which would have been needed to be active to achieve said specified probability that a sequence will be lost; and, in the event that this latter estimate is greater than the former estimate, providing an indication of the shortfall.

2. The method as claimed in claim 1, including the step of transferring the copies for the billing function of the network to an operator of the call centre, and said steps of sorting, dividing, designating, counting, processing, and providing are performed by that operator.

3. The method as claimed in claim 2, wherein said accessing step is such that said transferring step is performed substantially immediately after the billing function has generated the call records.

* * * * *